US011622531B2

(12) United States Patent
Li

(10) Patent No.: US 11,622,531 B2
(45) Date of Patent: Apr. 11, 2023

(54) LITTER COMPOSITIONS

(71) Applicant: Société des Produits Nestlé S.A., Vevey (CH)

(72) Inventor: James Li, Frontenac, MO (US)

(73) Assignee: SOCIÉTÉ DES PRODUITS NESTLÉ S.A., Vevey (CH)

(*) Notice: Subject to any disclaimer, the term of this patent is extended or adjusted under 35 U.S.C. 154(b) by 371 days.

(21) Appl. No.: 16/834,106

(22) Filed: Mar. 30, 2020

(65) Prior Publication Data
US 2020/0329661 A1 Oct. 22, 2020

Related U.S. Application Data

(60) Provisional application No. 62/836,998, filed on Apr. 22, 2019.

(51) Int. Cl.
A01K 1/015 (2006.01)
B01J 20/28 (2006.01)
B01J 20/20 (2006.01)
B01J 20/18 (2006.01)
B01J 20/10 (2006.01)
B01J 20/12 (2006.01)
B01J 20/32 (2006.01)

(52) U.S. Cl.
CPC .......... A01K 1/0155 (2013.01); A01K 1/0152 (2013.01); A01K 1/0154 (2013.01); B01J 20/106 (2013.01); B01J 20/12 (2013.01); B01J 20/18 (2013.01); B01J 20/20 (2013.01); B01J 20/28004 (2013.01); B01J 20/2808 (2013.01); B01J 20/28057 (2013.01); B01J 20/3204 (2013.01); B01J 20/3236 (2013.01); B01J 20/3293 (2013.01)

(58) Field of Classification Search
CPC .. A01K 1/0155; A01K 1/0152; A01K 1/0154; A01K 1/0107; B01J 20/106; B01J 20/12; B01J 20/18; B01J 20/20; B01J 20/28004; B01J 20/28057; B01J 20/2808; B01J 20/3204; B01J 20/3236; B01J 20/3293
USPC ........................................................ 502/400
See application file for complete search history.

(56) References Cited

U.S. PATENT DOCUMENTS

| 4,638,763 A | 1/1987 | Greenberg |
| 5,733,272 A | 3/1998 | Brunner et al. |
| 5,740,761 A | 4/1998 | Lee |
| 5,782,409 A | 7/1998 | Paul |
| 5,860,391 A | 1/1999 | Maxwell et al. |
| 6,276,300 B1 * | 8/2001 | Lewis, II ............. A01K 1/0152 119/172 |
| 6,287,550 B1 | 9/2001 | Trinh et al. |
| 7,603,964 B2 | 10/2009 | Jenkins et al. |
| 7,645,746 B1 | 1/2010 | Trinh et al. |
| 7,776,110 B2 | 8/2010 | Privitera et al. |
| 7,964,529 B2 | 6/2011 | Borgese et al. |
| 8,268,018 B2 | 9/2012 | Privitera et al. |
| 8,733,288 B2 | 5/2014 | Winkleman et al. |
| 9,010,274 B2 | 4/2015 | Drief et al. |
| 9,253,961 B2 | 2/2016 | Fritter et al. |
| 9,283,540 B2 | 3/2016 | Fritter et al. |
| 9,288,964 B2 | 3/2016 | Wang et al. |
| 2003/0072733 A1 | 4/2003 | Mcgee et al. |
| 2003/0200936 A1 * | 10/2003 | Raymond ............ A01K 1/0154 119/171 |
| 2006/0269472 A1 * | 11/2006 | Mackinnon ............ C01B 39/48 423/709 |
| 2007/0017453 A1 | 1/2007 | Fritter et al. |
| 2007/0083998 A1 | 4/2007 | Leskowicz |
| 2008/0022940 A1 * | 1/2008 | Kirsch ..................... B01J 20/12 119/173 |
| 2009/0126644 A1 | 5/2009 | Quellet et al. |
| 2011/0123474 A1 | 5/2011 | Jenkins et al. |
| 2011/0305659 A1 | 12/2011 | Woo et al. |
| 2012/0103269 A1 | 5/2012 | Matsuo et al. |
| 2012/0128620 A1 | 5/2012 | Mohr |
| 2013/0112605 A1 * | 5/2013 | Wyndham ............ B01J 20/3293 252/62.51 C |
| 2013/0230431 A1 * | 9/2013 | Mirowski ................ B01J 20/10 424/76.8 |
| 2013/0266657 A1 * | 10/2013 | Trajkovska .......... A01K 1/0107 424/490 |
| 2016/0101203 A1 | 4/2016 | Woo et al. |

FOREIGN PATENT DOCUMENTS

| CA | 2546538 | 11/2007 |
| WO | 1990009099 | 8/1990 |
| WO | 2012057825 A1 | 5/2012 |
| WO | 2016079883 | 5/2016 |

* cited by examiner

Primary Examiner — Brady W Frazier
Assistant Examiner — Zoe Tam Tran

(57) ABSTRACT

Provided herein are compositions and methods comprising a fragrance and from about 0.5 weight % to about 5.0 weight % of a granular malodor adsorbent which can be used to eliminate malodor in animal waste. The granular malodor absorbent can be granular molecular sieves or granulated activated carbon and has a pore size from about 0.4 nm to about 2.0 nm and a total surface area from about 100 $m^2/g$ to about 1500 $m^2/g$.

19 Claims, No Drawings

LITTER COMPOSITIONS

CROSS REFERENCE TO RELATED APPLICATIONS

This application claims priority to U.S. Provisional Application Ser. No. 62/836,998 filed Apr. 22, 2019 the disclosure of which is incorporated in its entirety herein by this reference.

FIELD OF THE DISCLOSURE

The present disclosure relates generally to animal litter compositions for malodor control comprising a fragrance and a granular malodor absorbent. More specifically, the present disclosure is directed to litter compositions comprising a fragrance and a granular malodor adsorbent with specific pore size and surface area.

BACKGROUND

Litter boxes are used by pets such as cats for elimination of urine and fecal matter. A litter box contains a layer of pet litter that receives the urine and fecal matter. The pet litter comprises an absorbent and/or adsorbent material and can be non-clumping or clumping. A clumping pet litter is a litter product in which the particles facilitate formation of clumps after the urine and fecal matter is deposited in the pet litter. The clumps are typically sifted from the litter box using a litter scoop and then discarded. Non-clumping pet litter can absorb urine and thus remove urine malodors, but replacing soiled non-clumping pet litter without emptying the entire box of litter can be difficult. A deodorizer can be added to the pet litter to absorb malodor from the pet urine and fecal matter.

The addition of fragrance is often used to counteract the malodors in animal litters such as cat litter. Typically, high levels of added fragrance correlate with increased malodor control or malodor masking. However, for various reasons, strongly scented products such as cat litter may not be desirable for the pet or pet owner. Therefore, there is a need to further improve malodor control performance of animal litter without increasing the perception of fragrance intensity.

One method to improve malodor control without the addition of large quantities of fragrance is to use strong malodor adsorbents such as activated carbon. However, in general, the fragrance is not compatible with strong adsorbents, such as powdered activated carbon, because the adsorbent may preferentially interact with and absorb the fragrance instead of the malodor. As a result, the fragrance intensity will be reduced while the malodor intensity may be unchanged or increased.

One method to overcome the incompatibility of fragrances and adsorbent materials, described in U.S. Pat. No. 5,782,409, relies on physical separation of the fragrance and the malodor adsorber. However, the requirement for such separation is inconvenient, uneconomical and inefficient. Other methods rely on encapsulation or enrobing of the fragrance. However, encapsulation may also have challenges related to efficient and timely delivery and physical stability.

It is therefore an object of the present disclosure to provide improved litter compositions that overcome the aforementioned drawbacks and disadvantages that are associated with existing malodor control technologies.

SUMMARY

The present disclosure is generally related to animal litter compositions comprising a fragrance and a granular malodor adsorbent, wherein the granular malodor adsorbent is present in an amount from about 0.05 weight % to about 5.0 weight %, has a pore size from about 0.4 nm to about 2.0 nm, and a total surface area from about 100 m$^2$/g to about 1500 m$^2$/g and wherein the granular malodor adsorbent substantially adsorbs malodor and substantially excludes the fragrance.

Another aspect of the present disclosure is generally related to a method for reducing or eliminating malodor in animal litter while providing a fragrant aroma to the surrounding environment comprising contacting the malodor with a composition comprising a fragrance and a granular malodor adsorbent, wherein the granular malodor adsorbent is present in an amount from about 0.05 weight % to about 5.0 weight %, has a pore size from about 0.4 nm to about 2.0 nm, and a total surface area from about 100 m$^2$/g to about 1500 m$^2$/g.

Many additional features and advantages will be apparent in view of the description. Moreover, it should be noted that the language used in the specification has been principally selected for readability and instructional purposes, and not to limit the scope of the inventive subject matter.

DETAILED DESCRIPTION

It must be noted that, as used in this disclosure and the appended claims, the singular forms "a," "an" and "the" include plural referents unless the context clearly dictates otherwise. Thus, for example, reference to "a granule" or "the granule" includes two or more granules.

The words "comprise," "comprises" and "comprising" are to be interpreted inclusively rather than exclusively. Likewise, the terms "include," "including" and "or" should all be construed to be inclusive, unless such a construction is clearly prohibited from the context.

However, the compositions and methods disclosed herein may lack any element that is not specifically disclosed. Thus, a disclosure of an embodiment using the term "comprising" includes a disclosure of embodiments "consisting essentially of" and "consisting of" the components identified. "Consisting essentially of" means that the embodiment comprises more than 50 wt. % of the identified components, at least 75 wt. % of the identified components, at least 85 wt. % of the identified components, at least 95 wt. % of the identified components, or at least 99 wt. % of the identified components.

The term "and/or" used in the context of "X and/or Y" should be interpreted as "X," or "Y," or "both X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

All percentages expressed herein are by weight of the total weight of the composition unless expressed otherwise. As used herein, "about," "approximately" and "substantially" are understood to refer to numbers in a range of numbers, for example, within the range of −10% to +10% of the referenced number, within −5% to +5% of the referenced number, within −1% to +1% of the referenced number, or within −0.1% to +0.1% of the referenced number. All numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The terms "pet" and "animal" are used synonymously herein and mean any animal which can use a litter box. Non-limiting examples include, a cat, a dog, a rat, a ferret, a hamster, a rabbit, an iguana, a pig and a bird. The pet can be any suitable animal, and the present disclosure is not limited to a specific pet animal.

The term "litter" means any substance that has sorptive properties for moisture and/or liquid such as animal urine and/or decreases malodor from animal urine and/or feces. A "clumping litter" or a "clumping deodorizer" forms aggregates when contacted by moisture. The aggregates are distinct from the other litter or deodorizer in the litter box that has not been contacted by moisture. A "clumping agent" binds adjacent particles when wetted. Therefore, "clumping" litter allows consumers to scoop out pet waste using a litter scoop with specific openings, while it is impossible or impractical to scoop out pet waste in "non-clumping" litter. A "non-clumping" litter does not form distinct aggregates. The term "deodorizer" means any substance that adsorbs or absorbs at least a portion of surrounding malodor and can be in a form that is added to the pet litter in a litter box. The term "elimination" means urination and/or defecation by a pet.

The term "litter box" means any apparatus that can hold pet litter. For example, a litter box can be a container with a bottom wall and one or more side walls, and/or any apparatus configured for litter to be positioned thereon, for example a mat or a grate. As a non-limiting example, a litter box may be a rectangular box having side walls that have a height of at least about six inches.

The term "mesh" is defined by the ASTM E-11 U.S.A. standard specification for sieves. As used herein, "size" of a particle refers to the length of the longest dimension of the particle.

The methods and devices and other advances disclosed herein are not limited to particular methodologies, protocols, and reagents, because as the skilled artisan will appreciate, they may vary. Further, the terminology used herein is for the purpose of describing particular embodiments only, and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, preferred devices, methods, articles of manufacture, or other means or materials are described herein.

One aspect of the present disclosure relates to animal litter compositions for malodor control comprising a fragrance and from about 0.05 weight % to about 5.0 weight % of a granular malodor adsorbent. The adsorbent can have a pore size from about 0.4 nm to about 2.0 nm. The adsorbent can also have a total surface area from about 100 m$^2$/g to about 1500 m$^2$/g. The granular malodor adsorbent may substantially adsorb malodor and substantially exclude the fragrance. The incorporation and compatibility of two malodor counteracting ingredients, malodor adsorbent and a fragrance, enhances the overall consumer experience. In some embodiments, the adsorbent has a total surface area from about 100 m$^2$/g to about 1200 m$^2$/g, from about 100 m$^2$/g to about 1100 m$^2$/g, from about 100 m$^2$/g to about 1000 m$^2$/g, from about 100 m$^2$/g to about 800 m$^2$/g, from about 100 m$^2$/g to about 700 m$^2$/g, or from about 100 m$^2$/g to about 600 m$^2$/g. In some embodiments the granular malodor adsorbent has a pore size of less than about 2.0 nm, less than about 1.0 nm, less than about 0.8 m, or less than about 0.6 nm.

The litter composition of the present disclosure includes one or more fragrances to provide a freshness and/or deodorizing impression to humans or serve as an attractant to animals. Fragrances are an important part of the animal care system. The fragrances may be natural or synthetic fragrances. Non-limiting examples of fragrance compositions include one or more esters, linear terpenes, cyclic terpenes, aromatics, amines, alcohols, aldehydes, ketones, lactones, and thiols. Non-limiting examples of specific fragrance compounds include limonene, linalool, 6-phenethyl alcohol, and myrcene.

In some embodiments, the fragrance is present in an amount from about 0.05 weight % to about 1.0 weight %. In other embodiments, the fragrance is present in an amount from about 0.05 weight % to about 0.4 weight %. In one embodiment, the fragrance is present in an amount of about 0.2 weight % or about 0.1 weight %.

In some embodiments, the majority of the fragrance is unencapsulated. For example, at least 75% of the fragrance is unencapsulated, at least 80% of the fragrance is unencapsulated, at least 85% of the fragrance is unencapsulated, at least 90% of the fragrance is unencapsulated, or at least 95% of the fragrance is unencapsulated.

In some embodiments, the granular malodor adsorbent adsorbs the malodor to a greater extent than the fragrance. For example, in one embodiment the malodor is adsorbed in an amount of about 25% to about 60% and the fragrance adsorption is less than 40% relative to a control sample with no granular malodor adsorbent. In another embodiment, the malodor is adsorbed in an amount of about 30 to about 60% and the amount of fragrance adsorbed is less than 40% relative to a control sample with no granular malodor adsorbent. In one embodiment, the malodor is adsorbed in an amount from about 30% to about 40% and the fragrance adsorption is close to 0% relative to a control sample with no granular malodor adsorbent. In some embodiments, the granular malodor adsorbent adsorbs at least 25% of the malodor or at least 30% of the malodor. In some embodiments, the granular malodor adsorbent excludes at least about 40%, at least about 50%, at least about 70% of the fragrance, or at least about 75%.

In some embodiments, the animal litter composition comprising the granular malodor adsorbent has a reduced malodor perception of at least 25% or at least 30% compared to a control with no granular adsorbent. In some embodiments, the animal litter composition comprising the granular malodor adsorbent has an equivalent fragrance perception compared to a control with no granular malodor adsorbent. In some embodiments, the animal litter composition comprising the granular malodor adsorbent has an increased fragrance perception compared to a control with no granular malodor adsorbent. In some embodiments, the animal litter composition comprising the granular malodor adsorbent has a reduction of fragrance perception less than about 30%, less than about 40%, less than about 50% or less than about 60% relative to a control with no granular malodor adsorbent.

The litter compositions of the present disclosures include a granular malodor adsorbent. In some embodiments, the granular malodor adsorbent comprises molecular sieves. A molecular sieve is a solid porous material that separates particles of molecular dimensions. Any material that has a relatively uniform pore size of molecular level can be regarded as a molecular sieve, including zeolites and carbon molecular sieves. Molecular sieves are available in a variety of forms, and includes powder, pellets, mesh and beads. Molecular sieves can be natural or synthetic. Zeolites are naturally occurring minerals found in volcanic ash. Zeolites are crystalline aluminosilicates of group IA and group IIA elements, such as sodium, potassium, magnesium and calcium. The litter composition of the present disclosure may use molecular sieves of the pellet, mesh or bead type. In some embodiments, the size of the molecular sieves can be −8 mesh to 60 mesh. In some embodiments, molecular sieves pellets are gently reduced or ground to produce granules having a size from about −8 mesh to about 60 mesh.

In some embodiments, the molecular sieves used in the present disclosure have a high surface area and a small pore size. In some embodiments, the molecular sieves have a surface area from about 200 $m^2/g$ to about 800 $m^2/g$. In another embodiment, the molecular sieves have a surface area from about 300 $m^2/g$ to about 600 $m^2/g$. In some embodiments, the molecular sieves have a pore size from about 0.2 nm to about 1.2 nm. In another embodiment, the molecular sieves have a pore size from about 0.3 nm to about 1.1 nm or about 0.4 nm to about 1.0 nm. In some embodiments, the molecular sieves have a pore size of about 0.6 nm or about 0.8 nm.

In some embodiments, the molecular sieves are present in an amount from about 0.05 wt. % to about 5.0 wt. % relative to the total litter composition. In another embodiment, the molecular sieves are present in an amount from about 0.1 wt. % to about 4.0 wt. %. In one embodiment, the molecular sieves are present in an amount from about 1.0 wt. % to about 3.0 wt. %. In one embodiment, the molecular sieves are present in an amount of about 2.0 wt. %.

In some embodiments, the granular malodor adsorbent comprises granular activated carbon. Granular activated carbon consists of particles larger than those found in powdered activated carbon. Granular activated carbon is typically categorized as material that is too large to pass through an 80-mesh sieve. Granular activated carbon is available in a range of sizes. In some embodiments, the granular activated carbon has a size from about −12 mesh to about 60 mesh. In some embodiments, the granular activated carbon has a size from about −12 mesh to about 40 mesh. In some embodiments, the granular activated carbon has a surface area from about 100 $m^2/g$ to about 1500 $m^2/g$, from about 100 $m^2/g$ to about 1200 $m^2/g$, from about 100 $m^2/g$ to about 1100 $m^2/g$, from about 100 $m^2/g$ to about 1000 $m^2/g$, from about 100 $m^2/g$ to about 800 $m^2/g$, from about 100 $m^2/g$ to about 700 $m^2/g$, or from about 100 $m^2/g$ to about 600 $m^2/g$. In some embodiments, the granular activated carbon has a pore size from about 0.4 nm to about 2.0 nm. In some embodiments the granular activated carbon has a pore size less than about 2.0 nm. In some embodiments, the adsorbent comprises carbon molecular sieves.

In some embodiments, the granular activated carbon is present in an amount from about 0.05 wt. % to about 5.0 wt. %. In another embodiment, the granular activated carbon is present in an amount from about 0.1 wt. % to about 4.0 wt. %. In one embodiment, the granular activated carbon is present in an amount from about 1 wt. % to about 3.0 wt. %. In one embodiment, the granular activated carbon is present in an amount of about 2.0 wt. %.

In some embodiments, the litter composition further comprises an absorbent substrate. In some embodiments, the absorbent substrate comprises absorbent granules each comprising an absorbent core and a distinct layer surrounding the absorbent core.

In some embodiments, the composition comprising the granular malodor adsorbent of the present disclosure can be obtained by dry mixing the granular malodor adsorbent with the absorbent substrate to form a blended litter composition. The blended litter composition has the ability to absorb moisture and/or liquid as well as reduce or eliminate malodor while providing a fragrance to the surrounding environment.

In some embodiments, the absorbent substrate comprises a clumping agent, wherein the clumping agent comprises bentonite, guar gum, starch, xanthan gum, gum Arabic, gum acacia, silica gel, and mixtures thereof.

In some embodiments, the clumping agent comprises bentonite. In one embodiment, the bentonite is sodium bentonite.

In some embodiments, the absorbent substrate comprises absorbent granules comprising an absorbent core, wherein the absorbent core comprises at least one of a clay, expanded perlite, quartz, feldspar, calcium bentonite, calcite, illite, calcium carbonate, carbon, mica, Georgia white clay, hectorite, zeolite, smectite, opal, kaolinite, pumice, tobermorite, slate, gypsum, vermiculite, halloysite, sepiolite, marl, diatomaceous earth, dolomite, attapulgite, montmorillonite, Monterey shale, Fuller's earth, silica, fossilized plant materials, perlites, perlite fines, and mixtures thereof.

In some embodiments, the absorbent substrate further comprises an additive selected from the group consisting of an anti-microbial agent, an anti-sticking agent, an agent for controlling pH, a dye, a coloring agent, a de-dusting agent, a disinfectant, an additional malodor control agent, and combinations thereof.

In some embodiments, the absorbent substrate has a density from about 50 $kg/m^3$ to about 2000 $kg/m^3$.

Non-limiting examples of absorbent substrates include non-swelling clay agglomerated into clay particles which are coated with clumping agent, such as swelling clay. The non-swelling clay used in the agglomeration process can be about 0.3 mm or smaller in size and is sometimes referred to as seed material. In an exemplary embodiment, clay particles range in size from about 0.15 mm or smaller.

One specific embodiment includes recovery of waste fines which include calcium-montmorillonite. The calcium-montmorillonite fines can be agglomerated in a pin mixer using water as a binder. The agglomerated fines have a moisture content of about 20% to about 40%. In another embodiment, the fines have a moisture content of about 28% to about 34%. The agglomerated fines can then be coated with bentonite powder with a particle size of about 0.15 mm or smaller using a centrifugal coater or rotary coater/dryer system.

In an exemplary embodiment, the non-swelling clay can be agglomerated using a pin mixer. A swelling clay can be applied to the agglomerated particles to form a coating. Non-limiting examples of swelling clay include sodium bentonite powder. In some embodiments, the swelling clay can be blended with guar gum. In some embodiments, the coating may be further augmented with either or both of an malodor control agent and an anti-microbial agent.

In one embodiment, the non-swelling clay is fed into a pin mixer using a screw extruder. Moisture (e.g. water) is added as a binder. The clay and moisture result in a cake-like substance as it enters the pin mixer. A pin mixer includes a shaft with a series of pins that break up the cake and results in the formation of small, spherically shaped particles which are separated from the cake-like substance using shaker screens. Other methods are contemplated which include using binders comprising guar gum and water or starch and water.

Another embodiment utilizes a blend of non-swelling clay and bentonite with water as a binder to produce particles through the pin mixing process. Still another embodiment utilizes sodium bentonite with water as a binder to produce particles from about 0.25 mm to about 3 mm in size using the pin mixer process. The agglomerated particles made by the any of the methods described above can be coated with a bentonite powder of about 0.15 mm or smaller using a centrifugal coater or rotary coater/dryer system for improved clumping capability.

In alternative embodiments, methods for coating an outer surface of non-swelling clay particles with a clumping agent include utilization of at least one of a fluidized bed dryer, a semi-continuous centrifugal coater or a rotary coating and drying system. In the rotary system, the clay particles and clumping agent are tumbled in a drum to mix for about 60 seconds. The litter is then removed from the drum and the drum is heated to about 300° F. to about 400° F. and the litter is returned to the drum and dried until about an 8% moisture content is obtained.

The resulting coated litter is typically in the −8 to 50 mesh size range, with a moisture content from about 5% to about 15%. In some embodiments, the moisture content is about 8%.

In one embodiment, the bentonite coating is about 20% to about 40% by weight of a coated particle. In an alternative embodiment, the bentonite coating is about 25% to about 35% by weight of a coated particle. In a further alternative embodiment, the bentonite coating is about 30% by weight of a coated particle.

In an alternative method for producing the litter, the agglomerated fines are placed in a fluidized bed and bentonite coating is sprayed in a low concentration solution.

The litter resulting from the compositions and methods described above has superior clumping properties as the active clumping agent is kept on the surface of the particles, where the clumping interaction occurs. In addition, the litter has a dust content which is lower than other known clumping litters, resulting in less tracking, as the coating processes described above result in a shell being formed around the agglomerated particles. Further, the litter is easier to remove from litter boxes than known clumping litter as the litter described herein is less likely to attach to litter boxes.

In another aspect of the present disclosure, the composition further comprises an absorbent substrate comprising absorbent granules having a relatively low density. The absorbent granules having a relatively low density can be non-agglomerated particles comprising perlite and a coating on the outer surface of the particle comprising a clumping agent. In one embodiment, the clumping agent comprises bentonite.

In some embodiments, the low density absorbent granules comprise a particle consisting essentially of expanded perlite and a coating on the outer surface of the particle. In one embodiment, the coating comprises a clumping agent which comprises bentonite. In another embodiment, the clumping agent comprises sodium bentonite and guar gum.

In some embodiments, the clumping agent comprising the coating of the perlite or expanded perlite can be bentonite, guar gum, starch, xanthan gum, gum Arabic, gum acacia, silica gel, and other minerals and mixtures thereof.

Where sodium bentonite is employed as or in the clumping layer, it should be understood that sodium bentonite refers to bentonite clay with a high percentage of sodium, but may also contain other clays or minerals, including calcium bentonite. Sodium bentonite can be sourced directly through mining operations (natural sodium bentonite) or it can be obtained from conversion of calcium bentonite through an ion exchange process. Where sodium bentonite is employed as or in the clumping agent, the bulk density of the bentonite is typically in the range of about 600 to about 1125 kg/m$^3$. In some embodiments, the density of the sodium bentonite is about 600 kg/m$^3$, about 700 kg/m$^3$, about 800 kg/m$^3$, about 900 kg/m$^3$, 1000 kg/m$^3$, or about 1100 kg/m$^3$.

In one embodiment, the moisture percentage in the sodium bentonite is about 6% to about 7%.

The bentonite can be provided as a powder or "fines" with a size of 0.2 mm or smaller. In an exemplary embodiment, the size of the sodium bentonite particles is about 0.15 mm or smaller.

A range of particle sizes can be used in the low density coated absorbent granules described herein. In some embodiments, the particles have a size of the expanded perlite is from about −8 to +30 mesh (U.S. standard sieve). In another embodiment, the particle size of the expanded perlite is from about −6 to +40 mesh. In some embodiments, the expanded perlite particles are not evenly distributed within the size range.

While typically at least some moisture is present in order to facilitate the coating process, the moisture content of the low density absorbent granules is relatively low. In one embodiment, the moisture content of the expanded perlite of the low density coated litter is between 0% and 3%. In another embodiment, the moisture content is about 0.5%.

In general, methods for preparing litter compositions in accordance with the disclosure involve coating a perlite and/or expanded perlite with a clumping agent. In one embodiment, the perlite is screened to select for particles of a predetermined size. For example, expanded perlite may be screened to eliminate particles smaller than 50 mesh U.S. standard sieve. In some embodiments, the perlite is screened to eliminate particles smaller than 40 mesh U.S. standard sieve or smaller than 30 mesh U.S. standard sieve.

The perlite particles can be placed in an enrobing machine to agitate the particles and assist in the reduction of fines, thus aiding in dust abatement. In an embodiment, expanded perlite particles are weighed before or as they enter the enrober and the particles are sprayed with water. The amount of water added generally depends upon the weight of the expanded perlite particles in the enrober. In some embodiments, the weight of water added is from about 20% to about 90% of the weight of the expanded perlite. In another embodiment, the weight of water added is from about 50% to about 85% of the weight of the expanded perlite. In one particular embodiment, the weight of water added is from about 65% of the weight of the expanded perlite particles.

The perlite particles are coated with the clumping agent (e.g. sodium bentonite) in a coater. By way of example, centrifugal coating methods can be employed. For instance, a batch of perlite particles are metered onto a feed belt by volume and fed into the coater as it rotates. Perlite particles roll inside the chamber of the coater in the direction of the rotation. In an optional pre-conditioning step, the perlite particles are spun in the coater for a period of time (e.g. 30 to 60 seconds) prior to coating.

Water can be added to the coater while the coater is spinning. Water added may be added based on the weight of the clumping agent to be added in the coater. The weight of water added is typically between approximately 10 to 100 percent of the weight of the clumping agent (e.g., 10%, 15%, 20%, 25%, 30%, 35%, 40%, 45%, 50%, 55%, 60%, 65%, 70%, 75%, 80%, 85%, 90%, 95%, or 100%). In one embodiment, for example, the weight of water added is between approximately 10 to 60 percent of the weight of the clumping agent (e.g., 10%, 15%, 20%, 25%, 30%, 35%, 40%, 45%, 50% 55%, or 60%). In another embodiment, for example, the weight of water added is between approximately 10 to 40 percent of the weight of the clumping agent (e.g., 10%, 15%, 20%, 25%, 30%, 35%, or 40%). In the alternative, water addition may occur in the enrober or in both the enrober and the coater.

The clumping agent (e.g. sodium bentonite) is metered into the coater. In general, the quantity of clumping agent added into the coater is based on the volume of perlite particles. In one embodiment, for example, from about 5 to about 45 pounds of sodium bentonite are added per cubic foot of expanded perlite (e.g., 5 pounds, 10 pounds, 12 pounds, 14 pounds, 20 pounds, 30 pounds, 35 pounds, 40 pounds, or 45 pounds). In another embodiment, for example, from about 20 to about 35 pounds of sodium bentonite are added per cubic foot of expanded perlite (e.g., 20 pounds, 25 pounds, 30 pounds, or 35 pounds). In yet another embodiment, from about 20 to about 30 pounds of sodium bentonite are added per cubic foot of expanded perlite (e.g., 20 pounds, 25 pounds, 27 pounds, 29 pounds, or 30 pounds). In one particular embodiment, approximately 30 pounds of sodium bentonite are added per cubic foot of expanded perlite.

Other coating materials, such as guar gum, may be included in the coater in addition to or in lieu of a bentonite-based clumping agent. Such materials may be added as a mixture, along with the bentonite, or they may be added in a separate step. As the bentonite (or other coating material) is metered into the chamber of the coater, it combines with the wet, spinning expanded perlite and forms a coating on the expanded perlite.

The coated perlite (e.g., expanded perlite) particles can optionally be further contacted (e.g., misted or sprayed) with water. In general, water added is added based on the weight of the clumping agent in the coater. In an exemplary embodiment, the weight of water added is from about 1 to about 5 percent of the weight of the clumping agent (e.g., 1%, 2%, 3%, 4%, or 5%). In another exemplary embodiment, the weight of water added is from about 5 to about 10 percent of the weight of the clumping agent (e.g., 5%, 6%, 7%, 8%, 9%, or 10%). In a further exemplary embodiment, the weight of water added is from about 1 to about 3 percent of the weight of the clumping agent (e.g., 1%, 2%, or 3%). In one particular embodiment, the weight of water added is approximately 2 percent of the weight of the clumping agent. In another particular embodiment, the weight of water added is approximately 5 percent of the weight of the clumping agent. In another particular embodiment, the weight of water added is approximately 9 percent of the weight of the clumping agent.

In an alternative embodiment, water may be added in a quantity appropriate to achieve a particular target moisture content following coating. In one embodiment, for example, water is added in a quantity appropriate to achieve a target moisture content from about 20 to about 40 percent (e.g., 20%, 21%, 22%, 23%, 24%, 25%, 26%, 27%, 28%, 29%, 30%, 31%, 32%, 33%, 34%, 35%, 36%, 37%, 38%, 39%, or 40%). In another embodiment, for example, water is added in a quantity appropriate to achieve a target moisture content from about 25 to about 30 percent. In one embodiment, a rotary system is utilized to coat the perlite particles with bentonite.

The coated particles are transferred to a dryer. Drying removes moisture from the coated particle without substantially removing the coating or substantially damaging the finished product. A fluidized bed dryer is utilized in certain embodiments. Typically, the coated particles are dried to have a moisture content ranging from about 1.5% to about 20%. In one embodiment, for example, the coated particles are dried to a moisture content ranging from about 5% to about 15% (e.g., about 5%, about 7%, about 9%, about 11%, about 13%, or about 15%). In another embodiment, for example, the coated particles are dried to a moisture content ranging from about 7% to about 10% (e.g., about 7%, about 8%, about 9%, or about 10%). In one particular embodiment, for example, the final moisture content of the coated litter product is approximately 10%. In another particular embodiment, the coated particles are dried to a moisture level sufficient to achieve a relatively uniform appearance of the coated particles.

Another screening process can be used. A vibratory screener may be used to remove coated expanded perlite particles larger than a mesh size of about 8, and smaller than a mesh size of about 40. Any excess coated expanded perlite separated in the screening process may be, for example, ground and added to other litter products or used in other malodor or moisture control products.

Various additives may be optionally applied to the animal litter composition. Additives may include, for instance, a malodor control agent(s), a fragrance(s), an anti-microbial agent(s), an anti-sticking agent(s), an agent(s) for controlling pH, a powder(s) for coloring, dyes, a coloring agent(s) and/or colored particles, a de-dusting agent(s), a disinfectant(s), or combinations thereof. In one embodiment, for example, at least a portion of the coated particles are further coated with a colorant. Various characteristics of coated litter products of the invention represent significant improvements over existing litter products.

By way of example, the density of the low density coated litter products is relatively low, compared to other litter products. Typically, for example, the density of the coated litter product is from about 200 to about 600 kg/m$^3$. In one embodiment, the density of the coated litter product is from about 300 to about 500 kg/m$^3$ (e.g., 300 kg/m$^3$, 350 kg/m$^3$, 400 kg/m$^3$, 450 kg/m$^3$, or 500 kg/m$^3$). In another embodiment, the density of the coated litter product is from about 350 to about 450 kg/m$^3$ (e.g., 350 kg/m$^3$, 400 kg/m$^3$, 450 kg/m$^3$). In one particular embodiment, the density of the coated litter product is approximately 350 kg/m$^3$. In another particular embodiment, the density of the coated litter product is approximately 400 kg/m$^3$. In another particular embodiment, the density of the coated litter product is approximately 450 kg/m$^3$.

In general, the perlite particles are substantially coated with the clumping agent. In one embodiment, for example, the particles are more than 75% coated. In other embodiments, for example, the particles are more than 85%, more than 95%, or more than 99% coated. Preferably, the coating material wholly surrounds or enrobes the particles. In some embodiments, agglomerated particles consisting mainly of expanded perlite can also be used.

Another aspect of the present disclosure relates to a method for reducing or eliminating malodor in animal litter while providing a fragrant aroma to the surrounding environment. The method comprises contacting the malodor with a composition comprising a fragrance and from about 0.05 weight percent to about 5.0 weight % of a granular malodor adsorbent. The granular malodor adsorbent has a pore size from about 0.4 nm to about 2.0 nm and a total surface area from about 100 m$^2$/g to about 1500 m$^2$/g.

In some embodiments, the method comprises a granular malodor adsorbent with a total surface area from about 100 m$^2$/g to about 1200 m$^2$/g, from about 100 m$^2$/g to about 1100 m$^2$/g, from about 100 m$^2$/g to about 1000 m$^2$/g, from about 100 m$^2$/g to about 800 m$^2$/g, from about 100 m$^2$/g to about 700 m$^2$/g, or from about 100 m$^2$/g to about 600 m$^2$/g.

EXAMPLES

Example 1

A series of litter samples were prepared containing a base litter plus varying amounts and types of adsorbent material. The base litter was a scented engineered litter comprising a non-clumping core and a clumping external layer comprising sodium bentonite.

Table 1 details the properties of the adsorbent materials used in the following Examples. Activated carbon A and B were commercially purchased. Aluminosilicate molecular sieves C and D were commercially purchased extruded pellets having a 1/16 inch diameter and were gently ground to produce granular molecular sieves having mesh size from about −8 to about 60 mesh.

TABLE 1

| Adsorbent | Form | Surface Area (m$^2$/g) | Main effective pore size (nm) |
|---|---|---|---|
| Activated Carbon (A) | Powder (<100 mesh) | ~1100 | <2 |
| Activated Carbon (B) | Granular (−12 to 40 mesh) | ~1100 | <2 |
| Molecular Sieve (C) | Granular | 300-600 | 0.8 |
| Molecular Sieve (D) | Granular | 300-600 | 0.6 |

Litter samples containing powdered activated carbon, Table 2 (Tests 1 and 2), were prepared by incorporating the powdered activated carbon as a layer between the non-clumping core and clumping external layer comprising sodium bentonite. In a typical sample preparation, 1.14 g high viscosity carboxymethyl cellulose sodium salt (CMC) was gradually added to 568 g of water in a blender with vigorous stirring until a uniform clear solution was formed. Then, 68.1 g of a coconut-based activated carbon powder was gradually added to the CMC solution with vigorous stirring until a uniform carbon slurry or suspension was formed. Next, 1.25 lbs of expanded perlite cores was added into a rotary coating machine rotating at about 500 RPM and then the prepared carbon slurry or suspension was added, followed by addition of 3.75 lbs dry sodium bentonite powder. The prepared litter material was later dried in a fluidized bed dryer to a moisture content of 6-12%, and sized to −8 to 30 U.S. mesh size. The carbon content in this litter sample was 3% by weight.

The litter samples containing granular activated carbon, Table 2 (Tests 3, 4 and 5), were prepared by drying the granular activated carbon at 120° C. for 4 hours, cooling to room temperature and then uniformly mixing the dried granular activated carbon with the clumping litter. The fragrance in the litter samples prepared as describe above was present in an amount of 0.15% by weight. For Tests 1 and 2, fragrance was added as a liquid to a final concentration of about 0.15% by weight, mixed and allowed to equilibrate for one week. For Tests 3, 4, and 5 a commercially purchased scented litter was used.

Example 2

The scented litter samples containing granular or powder adsorbent, prepared as described above, and control samples containing no additional granular or powder adsorbent, were tested for their ability to control malodor and maintain a fragrant aroma. Each sample was treated with cat urine and/or cat feces. After 5 days, the waste clumps were removed from the litter and each sample was rated on a scale of 0-100 by a sensory panel trained in the identification of aromatics associated with fecal, urine, ammonia and fragrance, utilizing an industry recognized methodology. The results are presented in Table 2.

TABLE 2

| Test | Base Composition | Adsorbent (Ads) | Ads (%) | Malodor Intensity | Fragrance Intensity |
|---|---|---|---|---|---|
| 1 | Scented clumping litter | None (Control) | NA | 14.18 | 46.41 |
|   |   | Powdered activated carbon (A) | 3 | 21.09 | 16.69 |
| 2 | Scented clumping litter | None (Control) | NA | 18.34 | 46.46 |
|   |   | Powdered activated carbon (A) | 1 | 25.35 | 19.43 |
| 3 | Scented clumping litter | None (Control) | NA | 21.98 | 45.48 |
|   |   | Granular activated carbon (B) | 3 | 15.96 | 25.50 |
| 4 | Scented clumping litter | None (Control) | NA | 22.71 | 34.38 |
|   |   | Granular activated carbon (B) | 3 | 11.05 | 13.61 |
| 5 | Scented clumping litter | None (Control) | NA | 13.95 | 43.16 |
|   |   | Granular activated carbon (B) | 3 | 8.91 | 25.88 |

The litter samples containing the powdered activated carbon adsorbent reduced the fragrance intensity by 58% or more compared to the control. In contrast, 2 of the 3 the litter samples containing the granular activated carbon reduced the fragrance intensity to a lesser extent. The malodor intensity was significantly increased compared to the control for the litter samples containing powdered adsorbent, while the litter samples containing the granular malodor adsorbent showed a reduction in malodor, in some cases as much as 50%.

Example 3

Litter samples containing granular molecular sieves were prepared by uniformly mixing the molecular sieve granules with scented clumping litter. The moisture level in the compositions was from about 6 wt. % to about 12 wt. %. The fragrance level was about 0.15 wt. %.

The litter samples containing the molecular sieves, prepared as described above, and control samples containing no additional adsorbent, were tested for their ability to control malodor and maintain a fragrant aroma. Each sample was treated with cat urine and/or cat feces. After 5 days, the waste clumps were removed from the litter and each clump was rated on a scale of 0-100 by a sensory panel trained in the identification of aromatics associated with fecal, urine, ammonia and fragrance, utilizing an industry recognized methodology. The results are presented in Table 3. The experiment was repeated using the same experimental design and the results are presented in Table 4.

TABLE 3

| Base Composition | Adsorbent (Ads) | % Ads | Malodor Intensity | Fragrance Intensity |
|---|---|---|---|---|
| Scented clumping litter | None (Control) | NA | 16.28 | 24.73 |
| Scented clumping litter | Granular MS (C) | 3 | 10.81 | 16.98 |
| Scented clumping litter | Granular MS (D) | 3 | 9.95 | 25.03 |

TABLE 4

| Base Composition | Adsorbent (Ads) | % Ads | Malodor Intensity | Fragrance Intensity |
|---|---|---|---|---|
| Scented clumping litter | None (Control) | NA | 26.37 | 23.5 |
| Scented clumping litter | Granular MS (C) | 3 | 15.11 | 17.91 |
| Scented clumping litter | Granular MS (D) | 3 | 16.9 | 27.08 |

The malodor reduction for each sample containing the granular molecular sieves was greater than 30%. In the two samples containing molecular sieves C, the reduction of fragrance perception was less than about 31% and in the two samples containing granular molecular sieves D the fragrance perception was increased.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Further, the present embodiments are thus not to be limited to the precise details of methodology or construction set forth above, as such variations and modification are intended to be included within the scope of the present disclosure. Moreover, unless specifically stated any use of the terms first, second, etc. do not denote any order or importance, but rather the terms first, second, etc. are merely used to distinguish one element from another.

What is claimed is:

1. An animal litter composition for control of malodor from pet urine and feces, the animal litter composition comprising a fragrance and a granular malodor adsorbent,
    wherein the granular malodor adsorbent is present in an amount from about 0.05 weight % to about 4.0 weight %, has a pore size from 0.4 nm to 0.8 nm and a total surface area from about 100 $m^2/g$ to about 1500 $m^2/g$,
    wherein the granular malodor adsorbent adsorbs about 25% to about 60% of the malodor from pet urine and feces and excludes at least 40% of the fragrance, and
    wherein the granular malodor adsorbent comprises molecular sieve granules.

2. The composition of claim 1, wherein the molecular sieve granules have a surface area from about 200 $m^2/g$ to about 800 $m^2/g$ and a pore size from about 0.4 nm to about 0.6 nm.

3. The composition of claim 1, wherein the molecular sieve granules have a mesh size from about −8 to about 60.

4. The composition of claim 1, wherein the fragrance is present in an amount from about 0.05 weight % to about 0.4 weight %.

5. The composition of claim 1, wherein the fragrance is unencapsulated.

6. The composition of claim 1, further comprising an absorbent substrate.

7. The composition of claim 6, wherein the absorbent substrate comprises an absorbent granule comprising an absorbent core and a distinct layer surrounding the absorbent core.

8. The composition of claim 6, wherein the absorbent substrate comprises clay.

9. The composition of claim 6, wherein the absorbent substrate comprises a non-swelling clay core coated with a swelling clay.

10. The composition of claim 6, wherein the absorbent substrate comprises an expanded perlite core coated with a swelling clay.

11. The composition of claim 9 or claim 10, wherein the swelling clay is sodium bentonite.

12. The composition of claim 1, wherein the granular malodor adsorbent adsorbs about 30% to about 40% of the malodor.

13. The composition of claim 1, wherein the granular malodor adsorbent excludes at least 75% of the fragrance.

14. A method for reducing or eliminating malodor from pet urine and feces while providing a fragrant aroma to the surrounding environment, the method comprising:
    contacting the malodor from pet urine and feces with a composition comprising a fragrance and a granular malodor adsorbent,
    wherein the granular malodor adsorbent is present in an amount from about 0.05 weight % to about 4.0 weight %, has a pore size from 0.4 nm to 0.8 nm and a total surface area from about 100 $m^2/g$ to about 1500 $m^2/g$, and
    wherein the granular malodor absorbent absorbs about 25% to about 60% of the malodor from pet urine and feces,
    wherein the granular malodor adsorbent comprises molecular sieve granules.

15. The method of claim 14, wherein the composition has an equivalent fragrance perception, an increased fragrance perception, or a fragrance perception that is less than about 60% reduced, relative to a control composition with no granular malodor adsorbent.

16. The composition of claim 2, wherein the surface area of the granular malodor adsorbent is about 300 $m^2/g$ to about 600 $m^2/g$, and the pore size is about 0.6 nm.

17. The composition of claim 2, wherein the surface area of the granular malodor adsorbent is about 300 $m^2/g$ to about 600 $m^2/g$, and the pore size is about 0.8 nm.

18. The composition of claim 1, wherein the granular malodor adsorbent further comprises activated carbon granules having a surface area from about 100 $m^2/g$ to about 600 $m^2/g$.

19. The composition of claim 18, wherein the activated carbon granules have a size from about −12 mesh to about 40 mesh.

* * * * *